United States Patent [19]

Kitahara et al.

[11] Patent Number: 5,294,422
[45] Date of Patent: * Mar. 15, 1994

[54] PROCESS FOR PURIFICATION OF RARE GAS

[75] Inventors: Koichi Kitahara; Kenji Ohtsuka; Noboru Takemasa; Shinobu Kamiyama, all of Hiratsuka, all of Japan

[73] Assignee: Japan Pionics Co., Ltd., Tokyo, Japan

[*] Notice: The portion of the term of this patent subsequent to Mar. 16, 2010 has been disclaimed.

[21] Appl. No.: 956,619

[22] Filed: Oct. 5, 1992

Related U.S. Application Data

[63] Continuation of Ser. No. 754,462, Sep. 3, 1991, Pat. No. 5,194,233.

[30] Foreign Application Priority Data

Sep. 14, 1990 [JP] Japan .................. 2-242586
Nov. 29, 1990 [JP] Japan .................. 2-325484
May 17, 1991 [JP] Japan .................. 3-210523

[51] Int. Cl.$^5$ .............................. B01D 53/04
[52] U.S. Cl. .................. 423/245.1; 423/210; 423/219; 423/230; 423/239.1; 423/246; 423/248
[58] Field of Search ............ 423/239, 245.1, 247, 423/248, 219, 230, 210, 246

[56] References Cited

U.S. PATENT DOCUMENTS

| | | | |
|---|---|---|---|
| 3,852,406 | 12/1974 | Krauss et al. | 423/219 |
| 4,839,085 | 6/1989 | Sandrock et al. | 420/900 |
| 4,869,883 | 9/1989 | Thorogood et al. | 423/219 |
| 5,194,233 | 3/1993 | Kitahara et al. | 423/248 |

FOREIGN PATENT DOCUMENTS

| | | | |
|---|---|---|---|
| 792561 | 3/1973 | Belgium . | |
| 0365490 | 4/1990 | European Pat. Off. | 423/248 |
| 2744191 | 4/1979 | Fed. Rep. of Germany | 420/900 |
| 1569298 | 5/1969 | France . | |
| 58-16046 | 1/1983 | Japan | 420/900 |
| 961925 | 6/1964 | United Kingdom . | |

OTHER PUBLICATIONS

Patent Abstracts Of Japan, Apr. 9, 1983, of JP-A-58016046, Gamou Kouji et al, "Material For Reversibly Absorbing and Releasing Hydrogen".

*Primary Examiner*—Michael Lewis
*Assistant Examiner*—Stuart L. Hendrickson
*Attorney, Agent, or Firm*—Frishauf, Holtz, Goodman & Woodward

[57] ABSTRACT

Highly purified rare gas (helium, neon, argon, krypton, xenon, etc.) is obtained by removing impurities contained therein, such as nitrogen, hydrocarbon, carbon monoxide, carbon dioxide, oxygen, hydrogen and water, at relatively low temperatures by the use of a getter. This getter is a two-component alloy of zirconium and vanadium, or a multi-component alloy containing, as well as zirconium and vanadium, at least one of chromium, nickel and cobalt.

4 Claims, 1 Drawing Sheet

PROCESS FOR PURIFICATION OF RARE GAS

This is a continuation of application Ser. No. 07/754,462 filed Sep 3, 1991, now U.S. Pat. No. 5,194,233 issued Mar. 16, 1993.

BACKGROUND OF THE INVENTION

1. Field of the Invention

The present invention relates to a process for purification of rare gas. More particularly the present invention relates to a process for efficiently removing impurities contained in rare gases, such as helium, neon, argon, krypton and xenon, by the use of a getter metal to thereby purify the rare gas.

2. Description of Related Arts

Rare gases are usually purified by the use of a getter because they have similar chemical properties. Among rare gases, helium and argon are widely used in the semiconductor fabrication industry which has been greatly developing in recent years, and a higher gas purity is required. Moreover, neon, krypton and xenon are essential for production of special lamps, and they are often recycled after being used once, for reuse thereof, because they are very expensive. In this case, it is required that the recycled gas is highly purified by removing the impurities contained therein. Thus, it is desired that nitrogen, hydrocarbon, carbon monoxide, carbon dioxide, oxygen, hydrogen, water, etc., present in the ppm order in the rare gas be removed to the ppb order.

Among rare gases, argon is used in an extremely large amount and, therefore, purification of argon has been mainly under investigation. It is well known that technical information obtained by investigation of the purification of argon is also applicable to purification of other rare gases. There are two types of getters: a vaporization type in which barium, for example, is used, and a non-vaporization type in which titanium, zirconium or the like is used. For the purification of rare gas, the non-vaporization type of getter is usually employed.

Heretofore, as a purification method using the nonvaporization type of getter, there has been employed a method in which nitrogen, hydrocarbon, carbon monoxide, carbon dioxide, oxygen, hydrogen, water, etc., are removed by the use of titanium or a titanium-base alloy. In this method, since it is necessary to maintain the getter at a temperature as high as about 1,000° C., materials for use in, for example, a purification cylinder are substantially limited to quartz, from a viewpoint of thermal resistance. Moreover, when the purification cylinder is used under pressure, there is the danger of it breaking; that is, there is a safety problem. For this reason, the number of purification apparatuses using titanium or a titanium alloy is decreasing, and attempts to develop a purification apparatus using zirconium or its alloy as the getter have been made. Use of zirconium or its alloy as the getter enables lowering the operating temperature of the purification apparatus to 400° to 700° C., and employing stainless steel, etc., for production of the purification apparatus, thereby producing the advantages that the danger of operation under pressure is eliminated and at the same time, an ability to remove hydrogen, which is barely removed at high temperatures, is increased Japanese Patent Application Laid-Open No. 3008/1987 for example, discloses a Zr-V-Fe three-component alloy as a getter, and a purification apparatus using the threecomponent getter, which permits purification at lowered temperatures. However, since the three-component getter is relatively poor in its ability to remove impurities, specifically nitrogen and hydrocarbon, it has disadvantages in that the apparatus must be increased in size, a large space is needed for setting up the apparatus, and production costs of the apparatus are increased.

Japanese Patent Application Laid-Open No. 118045/1990 discloses a Zr-Al-V three-component alloy getter, and British Patent 1,370,208 discloses a Zr-Ti-Ni three-component alloy getter. These getters have a relatively high ability of removing hydrogen, but have a low ability of removing nitrogen.

Journal of the Less-Common Metals, Vol. 53, pp. 117–131 (1977) describes reversible hydrogen absorption characteristics of three component alloys represented by $Zr(Co_x, V_{1-x})_2$ and $Zr(Fe_x, V_{1-x})_2$, but there cannot be found any description about the getter action on other gases.

Moreover, as a two component-alloy getter, a Zr-Ti alloy is disclosed in U.S. Pat. No. 2,926,981. In the vicinity of 400° C., the alloy has a higher rate of oxygen absorption than Zr or Ti alone, but it has a disadvantage of being low in absorption rate of other gases.

U.S. Pat. No. 4,071,335 proposes the use of a Zr-Ni alloy. Although the Zr-Ni alloy is excellent in the ability to remove hydrogen and water, its nitrogen removing ability is poor.

U.S. Pat. No. 4,306,887 describes Zr-Fe, which has a markedly poor ability to remove nitrogen.

SUMMARY OF THE INVENTION

As a result of investigations to overcome the prior art problems and to develop a purification method whereby nitrogen, hydrocarbon, carbon monoxide, carbon dioxide, oxygen, hydrogen, water, etc., contained in rare gas, can be removed to less than 10 ppb, particularly to less than 1 ppb at temperatures as low as 400° to 700° C., the purification operation can be carried out continuously for a long term, and the purification can be carried out by the use of a small size apparatus and further with high safety. It has been found that a getter comprising a two-component alloy of zirconium and vanadium, or an alloy of zirconium and vanadium with further at least one of chromium, nickel and cobalt added thereto, possesses a great ability to remove nitrogen, hydrocarbon, carbon monoxide, carbon dioxide, oxygen, hydrogen, water, etc., at low temperatures in the neighbourhood of 400° C. Based on these findings, the present invention has been completed.

The present invention provides a process for purifying a rare gas which comprises contacting the rare gas with an alloy getter comprising 5 to 90% of vanadium, the balance being zirconium, to thereby remove nitrogen, hydrocarbon, carbon monoxide, carbon dioxide, oxygen, hydrogen and water contained in the rare gas as impurities. According to the present invention, in place of the above alloy getter, there can be used a multi-component alloy getter comprising a mixture or alloy of vanadium and zirconium and at least one of chromium, nickel and cobalt, the proportion of vanadium being from 5 to 90% by weight based on the total weight of vanadium and zirconium.

BRIEF DESCRIPTION OF THE DRAWING

The Figure shows a flow of a rare gas purification apparatus which can be used in the present invention.

1 .. Inlet, 2 .. Outlet, 3 .. Getter, 4 .. Heater, 5 .. Purification Cylinder, 6 .. Feed Gas Inlet Tube, 7 .. Cooling Tube, 8 .. Purified Gas Outlet Tube

DESCRIPTION OF PREFERRED EMBODIMENTS

Figure 1:
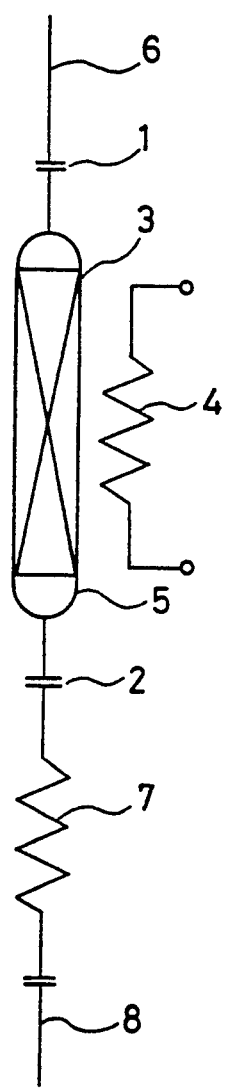

The getter for use in the present invention is a two-component alloy of vanadium and zirconium, or a multicomponent alloy of vanadium and zirconium, with further chromium, nickel and cobalt added thereto. The two-component alloy comprises 5 to 90% by weight, preferably 10 to 90% by weight of vanadium, with the balance being zirconium. The multi-component comprises vanadium and zirconium, and not more than 30 parts by weight, preferably 0.5 to 20 parts by weight of at least one of chromium, nickel and cobalt (total weight when they are used in combination) per 100 parts by the total weight of the vanadium and zirconium. If the amount of vanadium is less than 5% by weight, the impurity removing ability is decreased, and if it is more than 90% by weight, the resulting getter becomes expensive and its impurity removing ability is somewhat decreased. If the proportion of chromium, nickel and cobalt is more than 30 parts by weight, the impurity removing ability is sometimes decreased.

For preparation of the above alloys, commercially available vanadium having a purity of at least 90%, for example, is suitably used, and as the zirconium, commercially available zirconium sponge, for example, is suitably used. As the chromium, nickel and cobalt, commercially available ones can be used. These metals are mixed in a predetermined ratio, and then melted by applying an electron beam or an argon arc in a water cooled copper hearth, or by applying microwave heating or electric resistance heating in a crucible of magnesia, alumina, etc., in a vacuum or under reduced pressure in an atmosphere of inert gas such as argon to obtain the desired alloy. In use, the alloy thus obtained is ground to about 6 to 20 mesh by mechanical grinding such as by the use of a ball mill, a jaw crusher or a roll mill, or after finely grinding to about 100 mesh, molded into a pellet form. In order to obtain the multi-component alloy, all metal components may be mixed at the same time and then melted by heating, or after formation of the two-component alloy of vanadium and zirconium, at least one of chromium, nickel and cobalt may be added thereto and then melted by heating.

The getter thus obtained is charged in a purification cylinder and used in the state that it is heated at a temperature of at least 300° C., preferably 350° to 700° C., whereby impurities contained in the rare gas flowing through the purification cylinder are caught and removed by their reaction with the getter, and thus the rare gas can be continuously purified. Prior to the purification of the rare gas, the getter is usually subjected to activation treatment in a vacuum or in the rare gas at 500° to 900° C. for 10 to 600 minutes and preferably 550° to 800° C. for 30 to 400 minutes.

The present invention will hereinafter be explained more specifically referring to the attached drawing. The Figure shows a flow sheet of a purification apparatus of rare gas. The apparatus has an inlet 1 and an outlet 2. In the inside, a getter 3 is charged. To the inlet 1 of a purification cylinder 5 provided with a heater 4 is connected a feed gas inlet tube 6, and to the outlet 2, a cooler 7 is connected. At the downstream side of the cooler 7, a purified gas outlet tube 8 is connected.

In purification of the rare gas, the purification cylinder 5 is heated to a predetermined temperature for operation with the heater 4, and in this state, the feed rare gas is introduced from the inlet tube 6 through the inlet 1 into the purification cylinder 5. The rare gas passing through the purification cylinder 5 comes into contact with the getter 3, whereby impurities react with the getter 3 and are removed. The rare gas freed of the impurities is introduced through the outlet 2 into the cooler 7 where it is cooled to a predetermined temperature. The purified gas thus obtained is withdrawn through the outlet tube 8.

The getter of the present invention has a high impurity removing ability per unit weight and exhibits high activity at low temperatures in the neighbourhood of 400° C., and can efficiently decrease the content of nitrogen, hydrocarbon, carbon monoxide, carbon dioxide, oxygen, hydrogen, water, etc., in a rare gas to the level of less than 10 ppb, more specifically less than 1 ppb. Thus the purification apparatus can be decreased in size, and can be easily installed at a place of high cost, such as in a clean room in a semiconductor fabrication factory. Since the purification operation can be carried out at lowered temperatures, a purification cylinder made of metal, such as stainless steel, can be used. Thus the safety problem can be removed even under pressure, and at the same time, a circular furnace for heating is not needed; heating can be applied in a simplified manner such as by the use of a micro sheath heater. Miniaturization of installation and decrease in cost have been realized.

The present invention is described in greater detail with reference to the following examples.

EXAMPLE 1

A zirconium sponge and bulky vanadium (purity of at least 95%) both available on the commercial market were mixed so that the content of zirconium and vanadium were 80% and 20% by weight, respectively. The resulting mixture was melted in a water cooled copper hearth (10−4 Torr) by twice repeating an electron beam application operation to obtain about 500 g of an alloy. The alloy thus obtained was ground by the use of a ball mill in an atmosphere of argon, and a 14 to 20 mesh portion was separated by the use of a sieve to obtain a getter as a test sample.

A purification apparatus of the same construction as shown in the Figure was employed. A stainless steel tube having an outer diameter of 17.3 mm and an inner diameter of 14 mm was used as a purification cylinder, in which the above getter was charged to a height of 600 mm. The getter was previously subjected to activation treatment in an argon stream at 720° C. for 3 hours. A micro sheath heater and a heat insulating material were wound on the outside of the purification cylinder. There was prepared an argon gas to which the following impurities were added: 5 ppm of nitrogen, 0.1 ppm of methane, 1 ppm of carbon monoxide, 1 ppm of carbon dioxide, 1 ppm of oxygen, 1 ppm of hydrogen, and 5 ppm of water. While adjusting the temperature to 400° C., the argon gas was introduced by the use of a mass flow controller at a flow rate of 0.89 liter/min. and under a pressure of 4 kgf/cm$^2$ to continuously purify the argon gas. In connection with the analysis of each impurity in the argon gas, the methane, carbon monoxide and carbon dioxide contents were determined by FID gas chromatography, the hydrogen and nitrogen contents were determined by TCD gas chromatography, the oxygen content was determined by the use of a Hersch ppb oxygen analyzer, and the water content was determined by the use of a Panametric dew point meter. After a lapse of 3,400 hours from the start of flow of the argon gas, the passage of nitrogen was first observed. The result is shown in Table 1.

EXAMPLES 2 TO 6

In the same manner as in Example 1 except that the composition of zirconium and vanadium was changed, two component-alloy getters were prepared and tested for purification. In all of the two-component alloy getters, the passage of nitrogen was first observed. The results are shown in Table 1.

EXAMPLES 7 TO 13

Two-component alloys of zirconium and vanadium, having various compositions, were prepared in an argon atmosphere (260 Torr) in a magnesia crucible by application of microwave, and then were subjected to an activation treatment at 600° C. for 5 hours. These alloys were subjected to the same purification test as in Example 1. In all of the alloys, the passage of nitrogen was first observed. The results are shown in Table 1.

EXAMPLES 14 TO 18

Two-component alloys of zirconium and vanadium, having various compositions, were prepared under reduced pressure of 200 Torr by the use of a water cooled copper hearth and by applying argon arc, and then were subjected to an activation treatment at 600° C. for 5 hours. These alloys were subjected to the same purification test as in Example 1. In all of the alloys, the passage of nitrogen was first observed. The results are shown in Table 1.

COMPARATIVE EXAMPLES 1 AND 2

For each of the zirconium sponge and the vanadium, the same purification test as in Example 1 was conducted. The results are shown in Table 3.

EXAMPLES 19 AND 20

A mixture of 80 parts by weight of zirconium, 20 parts by weight of vanadium, and 5 parts by weight of bulky chromium or nickel was melted in a water cooled copper hearth by application of electron beam to prepare a three-component alloy getter. For this alloy getter, the same purification test as in Example 1 was conducted.

EXAMPLE 21

A mixture of 90 parts by weight of zirconium, 10 parts by weight of vanadium, 3 parts by weight of bulky chromium, and 2 parts by weight of nickel was melted in a water cooled copper hearth by application of electron beam to prepare a four-component alloy getter. For this alloy getter, the same purification test as in Example 1 was conducted. The results of Examples 19 to 21 are shown in Table 2.

EXAMPLES 22 AND 23

A mixture of 50 parts by weight of zirconium, 50 parts by weight of vanadium, and 3 parts by weight of bulky chromium or nickel was melted in a magnesia crucible under a reduced pressure of argon in the same manner as in Example 7 by application of microwave heating to prepare a three-component alloy getter. For this alloy getter, the same purification test as in Example 1 was conducted. The results are shown in Table 2.

EXAMPLES 24 TO 29

A mixture of zirconium, vanadium and commercial bulky cobalt, and optionally chromium and nickel, was melted in a water cooled copper hearts by application of electron beam to prepare a three-component alloy getter or a four-component alloy getter. For this alloy getter, the same purification test as in Example 1 was conducted. The results are shown in Table 2.

EXAMPLES 30 TO 32

A mixture of zirconium, vanadium and cobalt, or a mixture of zirconium, vanadium, cobalt, and chromium and/or nickel was melted in a magnesia crucible under a reduced pressure of argon in the same manner as in Example 7 by application of microwave heating to prepare a three-, four- or five-component alloy getter. For these alloy getters, the same purification test as in Example 1 was conducted. The results are shown in Table 2.

EXAMPLES 33 TO 35

A mixture of zirconium, vanadium and cobalt, or a mixture of zirconium, vanadium, cobalt, and chromium and/or nickel was melted in a water cooled copper hearth by application of argon arc heating to prepare a three-, four- or five-component alloy getter. For these alloy getters, the same purification test as in Example 1 was conducted. The results are shown in Table 2.

COMPARATIVE EXAMPLE 3

The same purification test as in Example 19 was conducted with the exception that the chromium was replaced by iron. The results are shown in Table 3.

COMPARATIVE EXAMPLE 4

The same purification test as in Example 19 was conducted with the exception that the chromium was replaced by aluminum and the mixture was melted by application of argon arc heating. The results are shown in Table 3.

COMPARATIVE EXAMPLES 5 TO 7

The same purification test as in Example 1 was conducted with the exception that the zirconium sponge and the commercially available bulky iron, chromium or nickel were mixed so that the proportion of the zirconium was 80% by weight and the proportion of the iron, chromium or nickel was 20% by weight, and the mixture was melted by repeating twice the operation of melting the mixture by application of argon arc heating. The results are shown in Table 3.

COMPARATIVE EXAMPLES 8 TO 10

The same alloy getters as those prepared in Comparative Examples 4 to 6 were prepared except that the mixture was melted in a magnesia crucible under a reduced pressure of argon by application of microwave heating. For these alloy getters, the same purification test as in Example 1 was conducted. The results are shown in Table 3.

TABLE 1

| Run No. | Composition of Getter (wt %) Zr | V | Passage Time of Nitrogen (hrs) | Melting Method |
|---|---|---|---|---|
| Example 1 | 80 | 20 | 3400 | Electron beam |
| Example 2 | 60 | 40 | 720 | Electron beam |
| Example 3 | 70 | 30 | 2800 | Electron beam |
| Example 4 | 75 | 25 | 3300 | Electron beam |
| Example 5 | 90 | 10 | 2700 | Electron beam |
| Example 6 | 95 | 5 | 850 | Electron beam |
| Example 7 | 80 | 20 | 3420 | Microwave under reduced pressure |
| Example 8 | 70 | 30 | 3570 | Microwave under reduced pressure |
| Example 9 | 60 | 40 | 4010 | Microwave under reduced pressure |
| Example 10 | 50 | 50 | 4230 | Microwave under reduced pressure |
| Example 11 | 40 | 60 | 5870 | Microwave under reduced pressure |
| Example 12 | 30 | 70 | 2520 | Microwave under reduced pressure |
| Example 13 | 20 | 80 | 1850 | Microwave under reduced pressure |
| Example 14 | 70 | 30 | 3240 | Ar arc |
| Example 15 | 60 | 40 | 4020 | Ar arc |
| Example 16 | 50 | 50 | 4150 | Ar arc |
| Example 17 | 40 | 60 | 5210 | Ar arc |
| Example 18 | 30 | 70 | 2230 | Ar arc |

TABLE 2

| Run No. | Getter Composition (parts by weight) Zr | V | Cr | Ni | Co | Passage Time (hrs) | Melting Method |
|---|---|---|---|---|---|---|---|
| Example 19 | 80 | 20 | 5 | — | — | 5300 | Electron beam |
| Example 20 | 80 | 20 | — | 5 | — | 3600 | Electron beam |
| Example 21 | 90 | 10 | 3 | 2 | — | 4000 | Electron beam |
| Example 22 | 50 | 50 | 3 | — | — | 4500 | Microwave under reduced pressure |
| Example 23 | 50 | 50 | — | 3 | — | 4300 | Microwave under reduced pressure |
| Example 24 | 75 | 20 | — | — | 5 | 3400 | Electron beam |
| Example 25 | 85 | 10 | — | — | 5 | 2700 | Electron beam |
| Example 26 | 80 | 15 | — | — | 5 | 3000 | Electron beam |
| Example 27 | 70 | 25 | — | — | 5 | 3300 | Electron beam |
| Example 28 | 75 | 20 | — | 2 | 3 | 3400 | Electron beam |
| Example 29 | 75 | 20 | 2 | — | 3 | 3800 | Electron beam |
| Example 30 | 50 | 50 | — | — | 3 | 4100 | Microwave under reduced pressure |
| Example 31 | 60 | 40 | 2 | — | 3 | 4640 | Microwave under reduced pressure |
| Example 32 | 40 | 60 | 2 | 2 | 2 | 4810 | Microwave under reduced pressure |
| Example 33 | 50 | 50 | — | — | 3 | 4050 | Ar arc |
| Example 34 | 60 | 40 | 2 | — | 3 | 4320 | Ar arc |
| Example 35 | 40 | 60 | 2 | 2 | 2 | 3780 | Ar arc |

TABLE 3

| Run No. | Getter Composition (parts by weight) Zr | V | Other Metal | | Passage Time (hrs) | Melting Method |
|---|---|---|---|---|---|---|
| Comparative Example 1 | 100 | 0 | — | — | 0 | — |
| Comparative Example 2 | 0 | 100 | — | — | 0 | — |
| Comparative Example 3 | 80 | 20 | Fe | 5 | 1100 | Electron beam |
| Comparative Example 4 | 80 | 20 | Al | 5 | 30 | Ar arc |
| Comparative Example 5 | 80 | 0 | Fe | 20 | 200 | Ar arc |
| Comparative Example 6 | 80 | 0 | Cr | 20 | 250 | Ar arc |
| Comparative Example 7 | 80 | 0 | Ni | 20 | 50 | Ar arc |
| Comparative Example 8 | 80 | 20 | Al | 5 | 180 | Microwave under reduced pressure |
| Comparative Example 9 | 80 | 0 | Fe | 20 | 240 | Microwave under reduced pressure |
| Comparative Example 10 | 80 | 0 | Cr | 20 | 200 | Microwave under reduced pressure |

What is claimed is:

1. A process for purifying a rare gas containing impurities which comprises contacting the rare gas at a temperature of 350° C. to 700° C. with an alloy getter selected from the group consisting of (a) an alloy consisting essentially of vanadium, zirconium and chromium and (b) an alloy consisting essentially of vanadium, zirconium, chromium and cobalt, said chromium in said alloy (a) or the total of said chromium and cobalt in said alloy (b) being in an amount of 0.5 to 20 parts by weight per 100 parts based on the total weight of the vanadium and the zirconium, said vanadium being in an amount of 5 to 90% by weight based on the weight of the vanadium and the zirconium, to remove at least one of nitrogen, hydrocarbons, carbon monoxide, carbon dioxide, oxygen, hydrogen and water, as impurities contained in the rare gas.

2. The process as claimed in claim 1, wherein prior to contacting the rare gas with the alloy getter, the alloy getter is subjected to an activate treatment at a temperature of from 500° C. to 900° C. for a time of from 10 to 600 minutes.

3. The process as claimed in claim 1, wherein the rare gas comprises methane as an impurity.

4. The process as claimed in claim 2, wherein the activation treatment is carried out at a temperature of 550° C. to 900° C. for 30 to 400 minutes.

* * * * *